(12) United States Patent
Suzuki

(10) Patent No.: US 7,609,592 B2
(45) Date of Patent: Oct. 27, 2009

(54) REPRODUCTION APPARATUS AND METHOD CAPABLE OF CALCULATING ERROR BETWEEN DESIGNATED TIME POINT AND TIME STAMP

(75) Inventor: Takuya Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 829 days.

(21) Appl. No.: 11/248,042

(22) Filed: Oct. 12, 2005

(65) Prior Publication Data

US 2006/0083128 A1    Apr. 20, 2006

(30) Foreign Application Priority Data

Oct. 18, 2004    (JP) .............................. 2004-302929

(51) Int. Cl.
*G11B 21/08* (2006.01)
(52) U.S. Cl. .................................... 369/30.18; 386/126
(58) Field of Classification Search ....... 369/30.1–30.18
See application file for complete search history.

(56) References Cited

U.S. PATENT DOCUMENTS

| 2002/0168174 | A1* | 11/2002 | Ito ................................ | 386/65 |
| 2005/0094987 | A1* | 5/2005 | Suzuki ........................ | 386/125 |
| 2005/0232597 | A1* | 10/2005 | Shimazaki et al. ........... | 386/95 |
| 2006/0098949 | A1* | 5/2006 | Suzuki ........................ | 386/98 |
| 2006/0165376 | A1* | 7/2006 | Park .............................. | 386/83 |

FOREIGN PATENT DOCUMENTS

| JP | 8-273304 | 10/1996 |
| JP | 8-275111 | 10/1996 |
| JP | 9-251763 | 9/1997 |
| JP | 10-134548 | 5/1998 |
| JP | 2000-50208 | 2/2000 |
| JP | 2000-173248 | 6/2000 |
| JP | 2003-228964 | 8/2003 |
| JP | 2004-213728 | 7/2004 |

OTHER PUBLICATIONS

Japanese Office Action for Japanese patent application No. 2004-302929, mailed Dec. 19, 2006, and English translation thereof 3 pages.
Patent Abstracts of Japan, Publication No. 08-273304, Publication Date: Oct. 18, 1996, 1 page.
Patent Abstracts of Japab, Publication No. 2004-213728, Publication Date: Jul. 29, 2004, 1 page.

(Continued)

*Primary Examiner*—Tan X Dinh
(74) *Attorney, Agent, or Firm*—Osha • Liang LLP

(57) ABSTRACT

When an operation unit receives a designated time point, a controller calculates an error between time point information and a reproduction time point of a tentative start packet, which is a start packet provided if packets were each reproduced for an average value of the packets' respective reproduction times. If the error falls within a predetermined range, the controller determines the tentative start packet as an effective start packet and, if the error exceeds the predetermined range, the controller determines an effective start packet in accordance with a pointer included in the tentative start packet.

12 Claims, 4 Drawing Sheets

OTHER PUBLICATIONS

Patent Abstracts of Japan, Publication No. 2000-173248, Publication Date: Jun. 23, 2000, 1 page.
Patent Abstracts of Japan, Publication No. 2003-228964, Publication Date: Aug. 15, 2003, 1 page.
Japanese Notice of Ground for Rejection for Japanese patent application No. 302929/2004, mailed Sep. 26, 2006, and English translation thereof, 4 pages.
Patent Abstracts of Japan, Publication No. 2000-050208, Publication Date: Feb. 18, 2000, 1 page.
Patent Abstracts of Japan, Publication No. : 09-251763, Publication Date: Sep. 22, 1997, 1 page.
Patent Abstracts of Japan, Publication No. 10-134548, Publication Date: May 22, 1998, 1 page.
Japanese Office Action for Application No. 2004302929, mailed on Feb. 24, 2009 (6 pages).
Patent Abstracts of Japan for Japanese Publication No. 08-275111, publication date Oct. 18, 1996 (1 page).

* cited by examiner

REPRODUCTION APPARATUS AND METHOD CAPABLE OF CALCULATING ERROR BETWEEN DESIGNATED TIME POINT AND TIME STAMP

BACKGROUND OF THE INVENTION

1. Field of the Invention

The present invention relates generally to reproduction apparatuses and methods capable of starting to reproduce compressed video images, music and other similar information, and particularly to reproduction apparatuses and methods capable of starting to reproduce information at a designated reproduction start time point.

2. Description of the Background Art

In recent years, digital versatile disk (DVD) is increasingly used as an optical disk capable of storing a variety of information such as motion video and music.

To allow video images, sound and the like of longer periods of time to be reproduced, DVD and similar storages media have recorded therein audio, video and/or other similar information encoded (or compressed), i.e., encoded data (hereinafter referred to as "compressed data"). The compressed data is divided into units of data each referred to as a packet having attached thereto timing information employed when the data is reproduced (or decoded). This information is referred to as a "time stamp".

When a user reproduces music, a video image and the like stored in a storage medium, the user often reproduces it at his/her desired portion. Accordingly, most reproduction apparatuses have a function effecting a time search process to obtain a position at which the information to be reproduced starts, as corresponding to a start time point designated by the user.

Apparatuses and methods associated with the time search process have conventionally been proposed. For example, Japanese Patent Laying-Open No. 2004-213728 discloses a DVD reproduction apparatus and method that can employ a time of reproduction of a cell included in program chain information to search for a reproduction position corresponding to a designated time.

Furthermore, Japanese Patent Laying-Open No. 2000-173248 discloses a time acquisition method that acquires from a pack of digital audio data a presentation time stamp (PTS) controlling a time point for reproduction, and also acquires a track's reproduction start time point and total reproduction time from management information to calculate the current reproduction time point and remaining reproduction time.

Furthermore, Japanese Patent Laying-Open No. 2003-228964 discloses a search method storing an integral up to each previous search pointer to a search pointer file at a sector, and calculating an integral up to a target search pointer in the sectors in conducting a search to obtain an address of a compressed audio file.

Compressed data equal in size can often be reproduced over different periods of time. This is because data having different amounts of information are compressed at different compression ratios (or bit rates).

For example in a specification for storing audio information to a DVD (i.e., a DVD audio specification) packed pulse code modulation (packed PCM) is supported as a form for compressed data. Packed PCM is a form of compressed data capable of maintaining the same quality as linear PCM numerically representing (or sampling) sound at constant temporal intervals and recording it.

If such compressed data is reproduced, and each packet's reproduction time is equal and a packet reproduced when reproduction starts is determined, there is a possibility that an offset (or error) is introduced between the user's desired reproduction portion and an actually reproduced portion. Although it depends on compressed data to be reproduced, this error is for example approximately five seconds. As the error is introduced, the user cannot reproduce music, video or the like at his/her designated point, and thus feels inconvenient and/or unsatisfied when he/she utilizes the reproduction apparatus.

The above disadvantage will be described with reference to a specific example. A reproduction apparatus has an "AB repeat function". When information's reproduction start and end time points (points A and B, respectively) are designated, the function repeatedly reproduces the information between points A and B.

For example, a user who desires to attain proficiency in spoken English may utilize the AB repeat function to repeatedly reproduce a sentence. The user determines start and end time points corresponding to a portion to be repeatedly reproduced, and designates points A and B.

When the AB repeat function is effected, the reproduction apparatus starts to reproduce the information at point A and when the reproduction apparatus reproduces the information up to point B the reproduction apparatus returns to point A for reproduction. The reproduction apparatus searches for and reproduces the compressed data corresponding to the reproduction start time point designated as point A. However, a reproduction time point as recorded in a time stamp can be different from that designated by the user. In that case, the apparatus starts to reproduce data at a point different from the reproduction start position designated by the user.

In particular, a reproduction start point determined by the apparatus is offset from a point designated by the user, the AB repeat function starts to reproduce information at an offset point for each reproduction. Accordingly, the user needs to handle it for example by redesignating point A, and will thus feel inconvenient and/or satisfied with the reproduction apparatus's performance.

If a time stamp is read from a packet having a time stamp (PTS) included therein and a packet that is reproduced at a time point closest to a designated time point is determined, the error between the designated time point and the stamp can be reduced. If a process is performed that reads a time stamp, for example in order of reproduction, from a packet including a time stamp, however, the process requires time and will compel the user to wait until the reproduction apparatus starts to reproduce information.

SUMMARY OF THE INVENTION

The present invention has been made to overcome such disadvantage and it contemplates a reproduction apparatus and method capable of starting to reproduce music, video and other similar information at a more precise position with respect to a designated reproduction time point.

In summary the present invention provides a reproduction apparatus reproducing information to be reproduced including a plurality of packets that can have different reproduction times, including: a receiver receiving as the information to be reproduced audio information stored on a digital versatile disk; an input device operated by a user to input a designated time point; and a reproducer receiving the information to be reproduced from the receiver and the designated time point from the input device to determine therefrom a start packet among the plurality of packets and set the start packet as a start point to reproduce the information to be reproduced. The reproducer includes: a tentative determinator receiving the information to be reproduced and the designated time point to calculate an average value of the plurality of packets' respective reproduction times and determine as a tentative start packet a packet started to be reproduced at a time point closest to the designated time point if the plurality of packets were each reproduced in an order of reproduction for the average value; a calculator operative for the tentative start packet including a time stamp to read the time stamp to determine therefrom a reproduction time point of the tentative start packet if the tentative start packet were reproduced, and operative for the tentative start packet excluding a time stamp to read a time stamp from a packet to be reproduced before or after the tentative packet and therefrom determine the reproduction time point to calculate an error between the reproduction time point and the designated time point, the tentative start packet being a packet including a pointer designating a relative location of a packet to be reproduced at a time point before or after the reproduction time point by a predetermined unit time; a final determinator operative for the error falling within a predetermined range to determine the tentative reproduction start point as an effective reproduction start point, and operative for the error exceeding the predetermined range to use the pointer to retrieve a packet to be reproduced before or after the tentative start packet that is reproduced at a time point having an error from the designated time point falling within the predetermined range, and correct the tentative reproduction start point to indicate the retrieved packet to determine the effective reproduction start point; and a packet reproducer starting reproducing the information to be reproduced with the effective reproduction start point serving as a start point.

The present invention in another aspect provides a reproduction apparatus reproducing information to be reproduced including a plurality of packets that can be different from each other in reproduction time, including: a receiver receiving the information to be reproduced; an input device operated by a user to input a designated time point; and a reproducer receiving the information to be reproduced from the receiver and the designated time point from the input device to determine therefrom a start packet among the plurality of packets and set the start packet as a start point to reproduce the information to be reproduced, The reproducer includes: a tentative determinator determining among the plurality of packets a tentative start packet corresponding to a tentative reproduction start point calculated from the information to be reproduced and the designated time point received; a calculator calculating an error between the designated time point and a reproduction time point of the tentative start packet if the tentative start packet were reproduced; a final determinator correcting the tentative reproduction start point in accordance with the error to determine an effective reproduction start point and determine among the plurality of packets an effective start packet corresponding to the effective reproduction start point; and a packet reproducer starting reproducing the information to be reproduced with the effective start packet serving as a start point.

Preferably if the error falls within a predetermined range the final determinator determines the tentative reproduction start point as the effective reproduction start point, and if the error exceeds the predetermined range the final determinator retrieves a packet to be reproduced before or after the tentative start packet and corrects the tentative reproduction start point to allow the effective reproduction start point to indicate a packet reproduced at a time point having an error from the designated time point falling within the predetermined range to determine the effective reproduction start point.

Preferably, if the tentative start packet includes a time stamp the time stamp is read and therefrom the calculator determines the reproduction time point, and if the tentative start packet does not include a time stamp then the calculator determines the reproduction time point as based on a time stamp read from a packet to be reproduced before or after the tentative start packet and including the time stamp. The tentative start packet includes a pointer designating a relative location of a packet to be reproduced at a time point before or after the reproduction time point by a predetermined unit time. If the error exceeds the predetermined range the final determinator uses the pointer to correct the tentative reproduction start point.

Preferably the tentative determinator calculates an average value of the plurality of packets' respective reproduction times and determines as the tentative start packet a packet started to be reproduced at a time point closest to the designated time point if the plurality of packets were each reproduced in an order of reproduction for the average value.

More preferably the receiver receives audio information recorded on a digital versatile disk as the information to be reproduced.

The present invention in still another aspect provides a method of reproducing information to be reproduced including a plurality of packets that can have different reproduction times, including the step of: receiving as the information to be reproduced audio information stored on a digital versatile disk; inputting a designated time point by a user; and determining from the information to be reproduced and the designated time point a start packet among the plurality of packets, and setting the start packet as a start point to reproduce the information to be reproduced. The step of determining and setting includes: receiving the information to be reproduced and the designated time point to calculate an average value of the plurality of packets' respective reproduction times to determine as a tentative start packet a packet started to be reproduced at a time point closest to the designated time point if the plurality of packets were each reproduced in an order of reproduction for the average value; if the tentative start packet includes a time stamp, reading the time stamp to determine therefrom a reproduction time point of the tentative start packet if the tentative start packet were reproduced, and if the tentative start packet excludes a time stamp, reading a time stamp from a packet to be reproduced before or after the tentative packet to determine therefrom the reproduction time point to calculate an error between the reproduction time point and the designated time point, the tentative start packet being a packet including a pointer designating a relative location of a packet to be reproduced at a time point before or after the reproduction time point by a predetermined unit time; if the error falls within a predetermined range, determining the tentative reproduction start point as an effective reproduction start point, and if the error exceeds the predetermined range, using the pointer to retrieve a packet to be reproduced before or after the tentative start packet that is reproduced at a time point having an error from the designated time point falling within the predetermined range, and correcting the tentative reproduction start point to indicate the retrieved packet to determine the effective reproduction start point; and setting the effective reproduction start point as a start point to start reproducing the information to be reproduced.

The present invention in still another aspect provides a method of reproducing information to be reproduced including a plurality of packets that can have different reproduction times, including the step of: receiving the information to be reproduced; inputting a designated time point by a user; and determining from the information to be reproduced and the designated time point a start packet among the plurality of packets and setting the start packet as a start point to reproduce the information to be reproduced. The step of determining and setting includes: determining among the plurality of packets a tentative start packet corresponding to a tentative reproduction start point calculated from the information to be reproduced and the designated time point received; calculating an error between the designated time point and a reproduction time point of the tentative start packet if the tentative start packet were reproduced; correcting the tentative reproduction start point in accordance with the error to determine an effective reproduction start point and determine among the plurality of packets an effective start packet corresponding to the effective reproduction start point; and setting the effective start packet as a start point to start reproducing the information to be reproduced.

Preferably in the step of correcting if the error falls within a predetermined range the tentative reproduction start point is determined as the effective reproduction start point and if the error exceeds the predetermined range a packet to be reproduced before or after the tentative start packet is retrieved and the tentative reproduction start point is corrected to allow the effective reproduction start point to indicate a packet reproduced at a time point having an error from the designated time point falling within the predetermined range to determine the effective reproduction start point.

Preferably, in the step of calculating if the tentative start packet includes a time stamp the time stamp is read and therefrom the reproduction time point is determined and if the tentative start packet does not include a time stamp then the reproduction time point is determined as based on a time stamp read from a packet to be reproduced before or after the tentative start packet and including the time stamp. The tentative start packet includes a pointer designating a relative location of a packet to be reproduced at a time point before or after the reproduction time point by a predetermined unit time. In the step of correcting if the error exceeds the predetermined range the pointer is used to correct the tentative reproduction start point.

Preferably in the step of determining the tentative start packet an average value of the plurality of packets' respective reproduction times is calculated and as the tentative start packet a packet is determined that is started to be reproduced at a time point closest to the designated time point if the plurality of packets were each reproduced in an order of reproduction for the average value.

More preferably in the step of receiving, audio information recorded on a digital versatile disk is received as the information to be reproduced.

Thus the present invention is mainly advantageous in that an error is calculated between a designated time point and a time stamp obtained from a tentative start packet, which is a start packet provided if packets were each reproduced for an average value of the packets' respective reproduction times, and if the error falls within a predetermined range the tentative start packet serves as a start packet to start reproducing information and if the error exceeds the predetermined range then a pointer included in data to determine a start packet to reproduce information so that the information can be reproduced at a precise position relative to a designated reproduction point.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
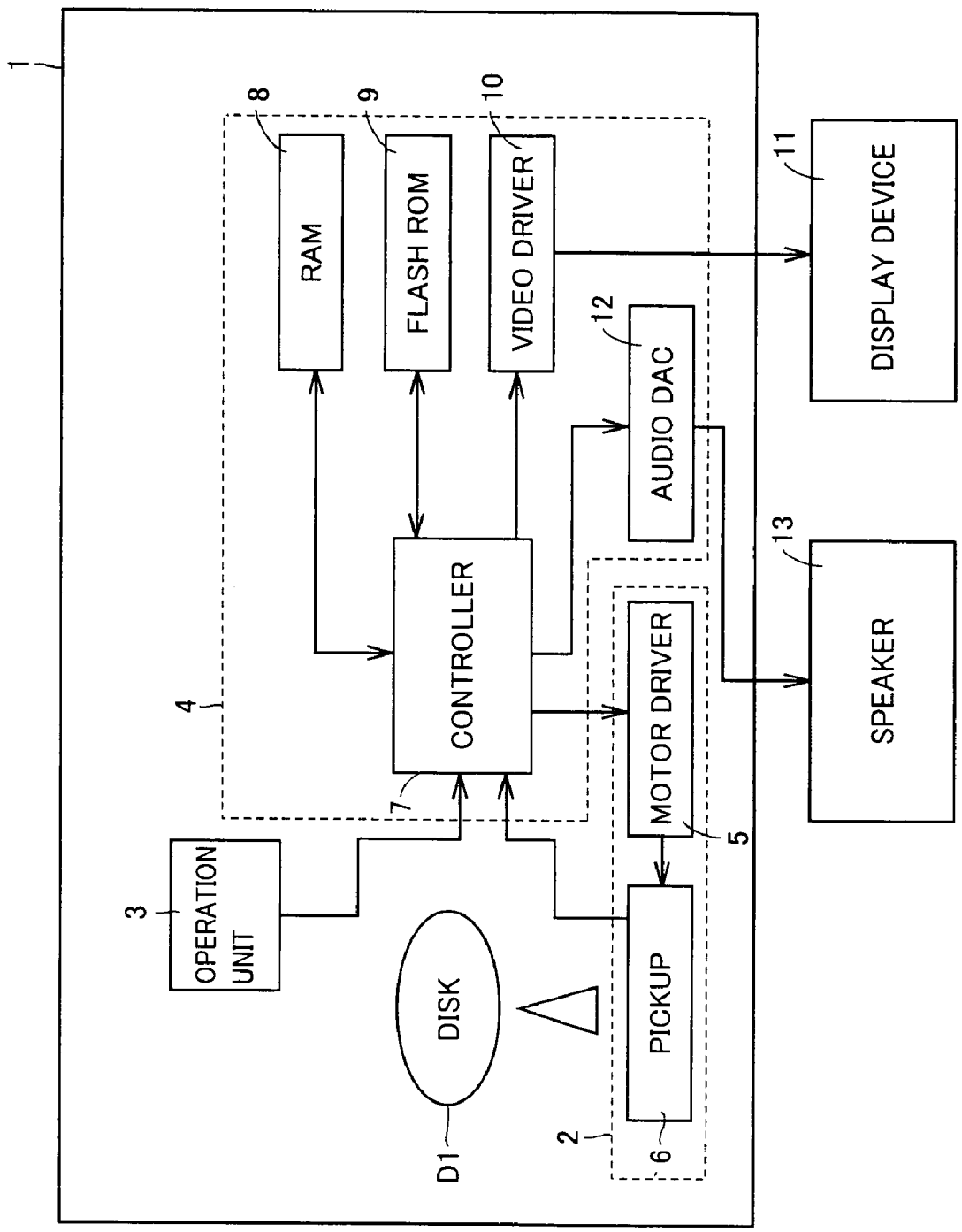
FIG. 1 is a block diagram showing an exemplary configuration of the present reproduction apparatus.

Hereinafter the present invention in embodiment will more specifically be described with reference to the drawings. In the figures, like reference characters indicate like components.

FIG. 1 is a block diagram showing an exemplary configuration of the present reproduction apparatus.

With reference to the figure, reproduction apparatus 1 includes a receiver 2 receiving from a disk 1 information to be reproduced including a plurality of packets having reproduction times, respectively, that can be different from each other, an operation unit 3 receiving a designated time point from a user, and a reproducer 4 receiving from the information from the receiver and the designated time point received from an input unit and determining therefrom a start packet among the plurality of packets, and starting to reproduce the information such that the start packet serves as a start point.

Receiver 2 includes a motor driver 5 and a pickup 6. Motor driver 5 operates in response to a signal transmitted from reproducer 4 to output a signal applied to drive pickup 6. Pickup 6 operates in response to a signal transmitted from motor driver 5 to receive information to be reproduced from disk D1.

Operation unit 3 receives from the user instructions of the designated time point as well as to reproduce, stop and eject a disk, and the like.

Reproducer 4 includes a controller 7, a random access memory (RAM) 8, a flash read only memory (flash ROM) 9, a video driver 10, and an audio digital analog converter (audio DAC) 12.

Note that although not shown in FIG. 1, controller 7 includes a tentative determinator determining among the plurality of packets a tentative start packet corresponding to a tentative reproduction start point calculated as based on information to be reproduced and a designated time point as received, a calculator calculating an error between the designated time point and a reproduction time point that is introduced if the tentative start packet were reproduced, a final determinator driven by the error to correct the tentative reproduction start point to determine an effective reproduction start point, and determine among the plurality of packets an effective start packet corresponding to the effective reproduction start point, and a packet reproducer (or decoder) starting to reproduce the information at the effective a start packet.

The packet reproducer includes a video decoder, an audio decoder, and a subpicture (SP) decoder. If disk D1 is a DVD audio disk, then a packet (or audio pack) transmitted from receiver 2 is processed by the audio decoder. If disk 1 is a DVD video disk then a packet transmitted from receiver 2 is separated in controller 7, depending on the data's content, into a video pack, an audio pack, an SP pack, and processed in the video decoder, the audio decoder, the SP decoder, respectively.

RAM 8 temporarily stores information to be reproduced received from disk D1 by receiver 2, instructions, a designated time point and the like input through operation unit 3, and the like. RAM 8 is also used as a work area when controller 7 performs a prescribed operation.

For example, RAM 8 temporarily stores a header of a packet required when controller 7 performs the time search process, a reproduction process and other various processes. A pack transmitted to each decoder incorporated in controller 7 is processed for reproduction in synchronization with a value of a PTS included in a header. Thus reproduction apparatus 1 can output sound to a speaker 13, a movie with Japanese subtitles on a screen of a display device 11.

Flash ROM 9 stores a variety of control programs required to control reproduction apparatus 1.

Video drivers 10 and audio DAC 12 receive video and audio signals, respectively, reproduced by controller 7. Video driver 10 operates in response to the video signal to output a drive signal applied to drive display device 11. Display device 11 operates in response to the drive signal to display a video image. Audio DAC 12 converts a digital audio signal to an analog audio signal and transmits the analog audio signal to speaker 13. Speaker 13 outputs sound in accordance with the analog audio signal.

Controller 7 performs the time search process, as will be generally described hereinafter. When controller 7 receives a designated time point from operation unit 3, controller 7 calculates an error between the designated time point and a tentative start packet's reproduction time point. The tentative start packet is a start packet provided if packets were each reproduced for an average value of the packets' respective reproduction times. If the error falls within a predetermined range, controller 7 determines the tentative start packet as an effective start packet. If the error exceeds the predetermined range, controller 7 determines an effective start packet in accordance with a pointer included in the tentative start packet. Thus reproduction apparatus 1 can determine a reproduction start point with a reduced error from the designated start point.

Figure 2:
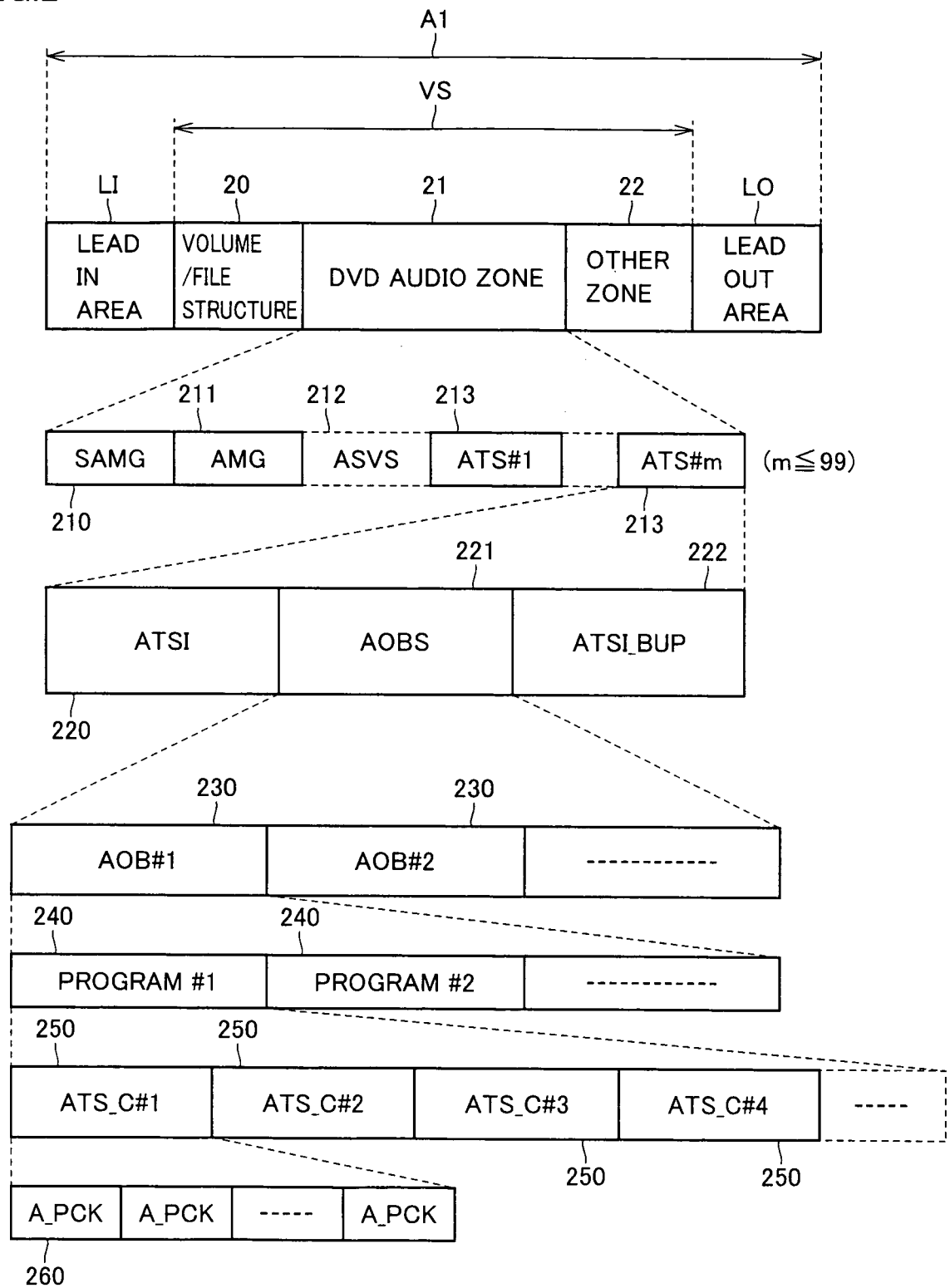
FIG. 2 shows a DVD audio's physical format.

FIG. 2 shows a DVD audio's physical format.

With reference to the figure, a DVD has a storage area A1 formed therein and including a lead in area LI, a volume space VS and a lead out area LO. Volume space VS includes a volume/file structure area 20, a DVD audio zone 21, and an other zone 22.

Volume file structure area 20 corresponds to a management area as determined in ISO9660 and UDF bridge. Volume/file structure area 20 includes information employed to control audio information's file structure. For example, for information to be reproduced, reproduction time, packet count, and other similar information are stored in volume/file structure area 20.

DVD audio zone 21 includes a simple audio manager (SAMG) 210, an audio manager (AMG) 211, an audio still video set (ASVS) 212, and m audio title sets (ATSs) 213 wherein m represents an integer of at least 1 and at most 99. Note that ASVS 213 is optional data and may not be stored in DVD audio zone 21.

Other zone 22 is a zone storing information other than audio information. The zone for example stores information that can be used in the DVD video zone at a video title set (VTS).

DVD audio zone 21 includes each domain, as described hereinafter.

SAMG 210 includes information required to reproduce linear PCM data or lossless packed PCM data (packed PCM data) through two channels.

AMG 211 includes information generally controlling DVD audio zone 21, such as information associated with a menu urging a viewer to select an item, information employed to prevent illegal copying, and like information.

ATS 213 includes audio title set information (ATSI) 220, a plurality of audio object sets (AOBSs) 221, and audio title set information backup (ATSI_BUP) 222.

ATSI 220 stores information such as audio title set program chain information (ATSPGCI), which is a variety of information associated with a program chain, which is a logical segment corresponding to a plurality of cells combined together. A "cell" is a minimum unit applied when a logical process is performed.

AOBS 221 includes one or more audio objects (AOB) 230 each including one or more audio cells (ATS_C) 250. Note that one or more audio cells 250 together form a program 240, and one or more such programs form a program chain (not shown).

Each audio cell is formed by a set of audio packs (A_PCK) 260 of a fixed size (of 2048 bytes). Audio pack 260 is a minimum unit applied when a data transfer process is performed.

Figure 3:
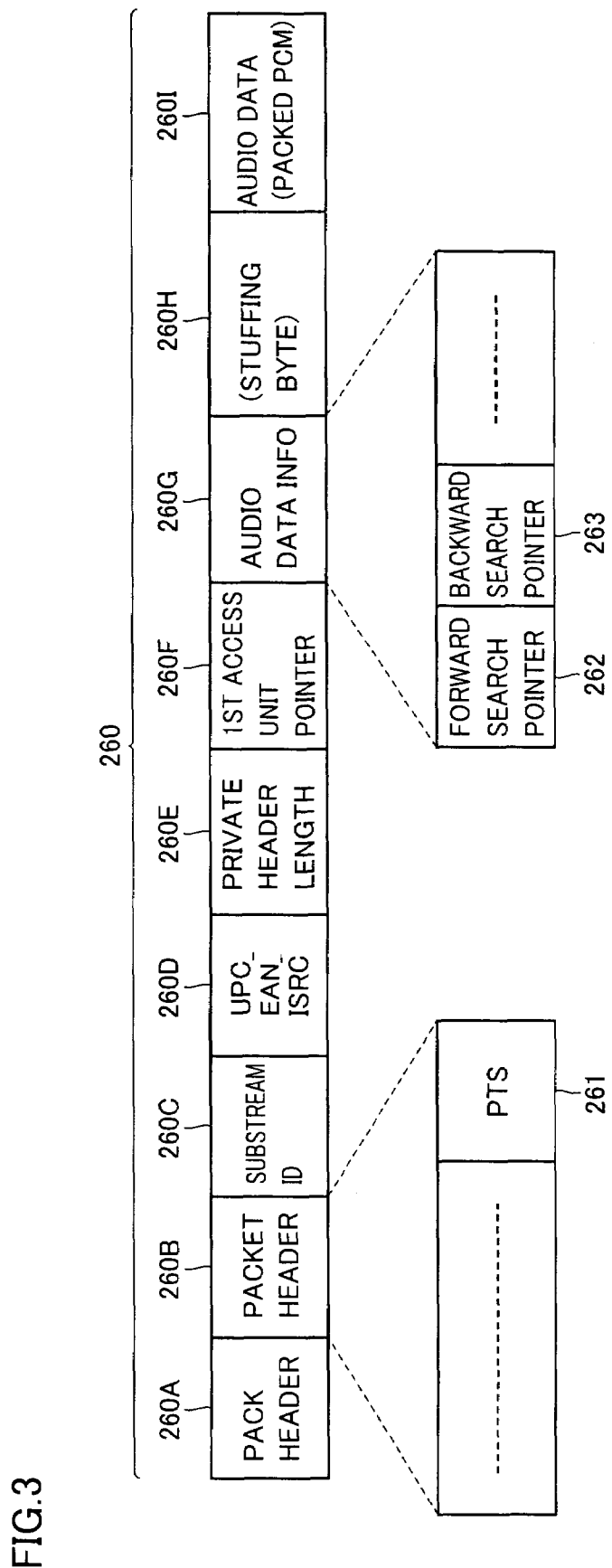
FIG. 3 shows a configuration of an audio pack 260 shown in FIG. 2.

FIG. 3 shows a configuration of audio pack 260 shown in FIG. 2.

With reference to the figure, audio pack 260 includes a pack header 260A and a packet header 260B including a PTS 261.

Audio pack 260 further includes a substream ID 260C indicating that stored information is compressed data, a UPC_EAN_ISRC 260D storing information of International Standard Recording Code (ISRC) of used parameter control (UPC), and private header length information 260E storing a private header's byte count. A "private header" is a remainder of audio pack 260 excluding pack header 260A, packet header 260B, and audio data 260I described later.

Audio pack 260 further includes first access unit pointer information 260F indicating a location (or address) on a DVD that stores a leading byte of audio data 260I, and audio data information 260G.

Audio data information 260G includes a pointer indicating the number of packets reproduced per unit time. As shown in FIG. 3, the pointer includes a forward search pointer (forward_au_search_pointer) 262 and a backward search pointer (backward_au_search_pointer) 263. Forward search pointer 262 indicates the number of audio packs reproduced earlier by the unit time than audio pack 260, and backward search pointer 263 indicates the number of audio packs reproduced later by the unit time than audio pack 260.

Audio pack 260 further includes a stuffing byte 260H adjusting a pack length to be the fixed length, and audio data (packed PCM data) 260I corresponding to audio information to be reproduced.

Figure 4:
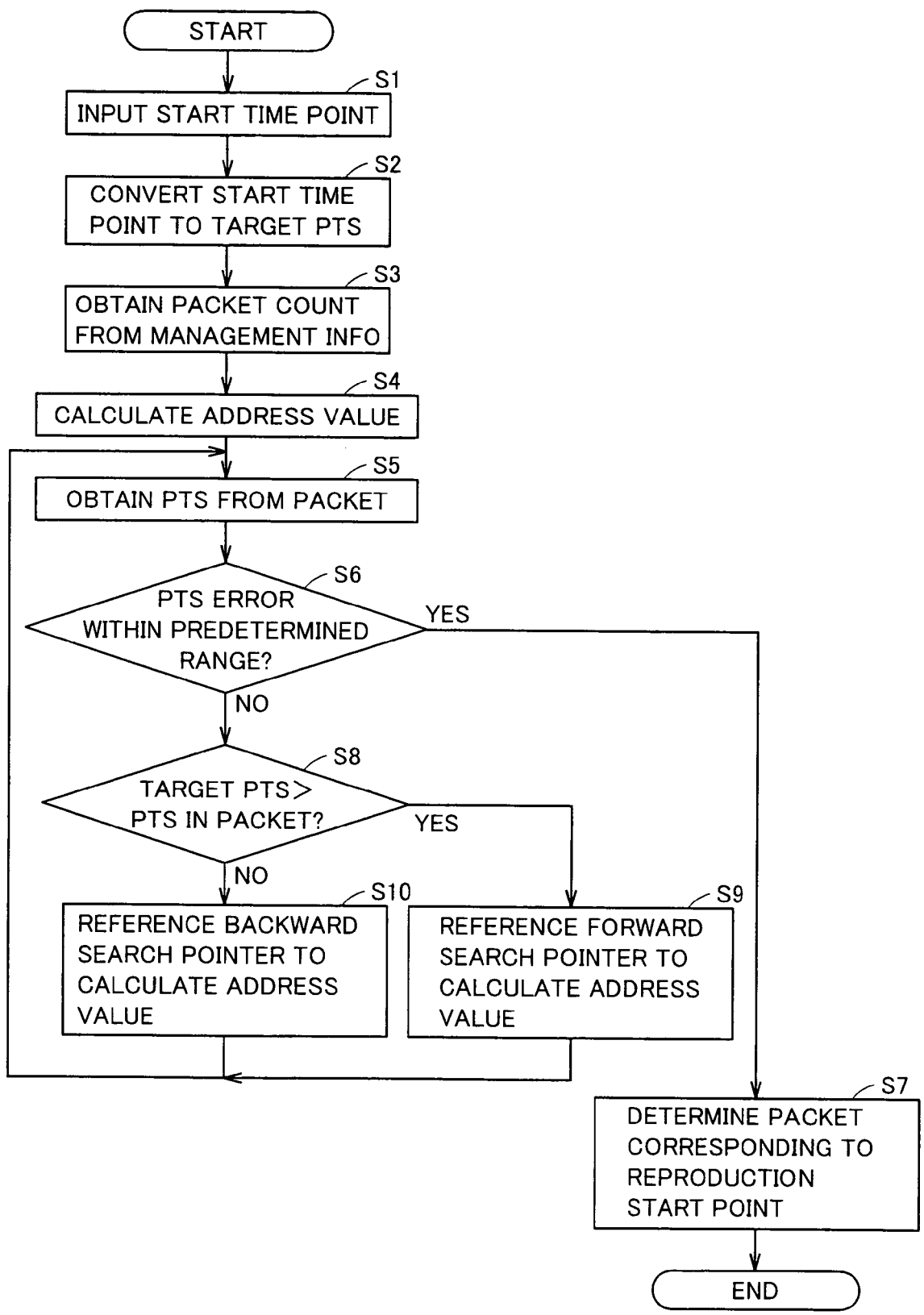
FIG. 4 is a flow chart of a time search process in a reproducer 4.

FIG. 4 is a flow chart of the time search process performed in reproducer 4.

With reference to the figure, at step S1 a user inputs to operation unit 3 a time point designated as a start time point, which is in turn transmitted to controller 7. Receiver 2 receives from disk D1 information to be reproduced that is to be processed.

The following steps S2-S10 are performed by controller 7 at the tentative determinator, the calculator and the final determinator.

At step S2 the calculator converts the designated time point to a value of a time stamp. Hereinafter this time stamp will be referred to as a "target PTS". The calculator obtains the target PTS by multiplying a period of time (in seconds) elapsing between a reproduction start time point of the information to be reproduced and the designated time point by 90,000. For example if with the reproduction start time point serving as a reference the designated time is 10 seconds then the target PTS's value is 10×90,000=900,000.

At step S3, to calculate an average value of packets' reproduction times, the tentative determinator for example transmits an instruction to receiver 2. Receiver 2 receives the instruction from the tentative determinator and obtains from the disk D1 management information area (the FIG. 2 volume/file structure area 20) information of the total number and total reproduction time of the audio packets of the information to be reproduced.

At step S4, to determine a tentative start packet, the tentative determinator calculates a reference address value, which is a location of a tentative start packet recorded on disk D1. The reference address value corresponds in the present invention to a tentative reproduction start point, and is calculated as follows:

$$\text{(reference address value)} = \text{(total number of audio packets)}/\text{(time stamp value indicating total reproduction time)} \times \text{(target PTS)} \quad (1).$$

In expression (1) the total number of audio packets and the total reproduction time thereof are values obtained at step S3 from the management information. Furthermore in expression (1) (total number of audio packets)/(time stamp value indicating total reproduction time) is an inverse of an average value of audio packets' reproduction times.

In other words, the reference address value is a value of an address indicating a location recording a packet that is started to be reproduced at a time point closest to the designated time point if a plurality of packets were each reproduced in an order of reproduction for an average value of the packets' reproduction times.

For example, if information to be reproduced has 136,936 audio packets in total and a total reproduction time of 27,920,400, as represented as a time stamp value, then these values and the target PTS's value obtained at step S2 introduced into expression (1) provide a reference address value of 4,414.

At step S5 the calculator obtains a time stamp from the tentative start packet. The reproduction time point provided if the tentative start packet were reproduced is determined from the time stamp obtained. Hereinafter this time stamp will be referred to as a "subject PTS".

Note that if the tentative start packet does not have a time stamp recorded therein (e.g., if audio data 260I has a size smaller than a decoding and reproduction unit and accordingly its leading byte is not recorded), the calculator may determine a reproduction time point for example from a time stamp of one of packets reproduced before and after the tentative start packet that has the time stamp recorded therein. In the following description each packet includes a time stamp for the sake of illustration.

At step S6 the final determinator calculates an error between the reproduction time point (the subject PTS) and the target PTS to determine whether the error falls within or exceeds a predetermined range set for example to be ±100 milliseconds (±9,000, as represented as a time stamp value).

If the error falls within the predetermined range (YES at step S6) the process proceeds with step S7, at which step the final determinator determines the reference address value as an effective reproduction start point. In other words, the tentative start packet is exactly used as a start packet actually reproduced.

If the error exceeds the predetermined range (NO at step S6) the process proceeds with step S8.

If a subject PTS obtained from a tentative start packet for the above described reference address (4,414) has a value of 1,720,785 then the error calculated at step S6 will be 1,720,785−900,000=820,785, which is greater than 9,000. Accordingly, the process proceeds from step S6 to step S8.

At step S8 the final determinator searches for a packet to be reproduced before or after the tentative start packet and corrects a tentative reproduction start point so that an effective reproduction start point indicates a packet reproduced at a time point having an error from the designated time point falling within the predetermined range to determine the effective reproduction start point.

The tentative start packet includes a pointer designating a relative location (or relative address value) of a packet to be reproduced at a time point before or after a reproduction time point by a predetermined unit time. This pointer is the FIG. 2 forward or backward search pointer 262 or 263. The final determinator employs these pointers to correct the tentative reproduction start point to determine an effective start packet.

Initially at step S8 the final determinator determines the target and subject PTSs in magnitude. If at step S8 a decision is made that the target PTS is larger than the subject PTS (YES at step S8) the process proceeds with step S9.

At step S9 the final determinator references forward search pointer 262 and follows the following expression:

$$\text{(relative address value)} = \text{(forward search pointer's value)} \times 4/90,000 \times \text{(target PTS−subject PTS)} \quad (2)$$

to calculate a relative address value of an audio packet from which a PTS is subsequently obtained. In expression (2) the value of 4/90,000 indicates an inverse of a value of reproduction time's minimum unit (0.25 second) as converted to a time stamp. In other words, a relative address value is calculated relative to a tentative start packet from a ratio of a PTS error and a minimum reproduction time.

If at step S8 a decision is made that the target PTS is smaller than the subject PTS (NO at step S8) the process proceeds with step S10, at which step the packet determinator references backward search pointer 263 included in an audio packet and follows the following expression:

$$\text{(relative address value)} = \text{(backward search pointer's value)} \times 4/90,000 \times \text{(subject PTS−target PTS)} \quad (3)$$

to calculate a relative address value.

In the above example the target PTS is smaller than the subject PTS, and at step S10 the backward search pointer 263 value is obtained. If the value is for example 56, expression (3) provides a relative address value of 2042.

From step S9 or S10 the process returns to step S5. From a packet designated by a subsequent address value a PTS is obtained and its error from the target PTS is calculated.

If the relative address value designates a packet having a PTS of 905,296 then at step S6 a PTS error of 5,296 is provided. The error falls within the predetermined range, and the final determinator at step S7 determines this packet as an effective start packet.

Note that while in the above description information to be reproduced that follows a DVD audio format is exemplified, the information to be reproduced may be information that follows a DVD video format.

The DVD video format is substantially the same in configuration as the FIG. 2 DVD audio format, except that for the former format, information to be reproduced includes a packet including a navigation pack, an audio pack, a video pack and an SP pack, whereas for the latter format, information to be reproduced includes a packet including an audio pack alone.

For the DVD video format, the FIG. 2 audio cell 250 is replaced with a logical unit referred to as a video object unit (VOBU) each having a top portion provided with a navigation pack having recorded therein a video object unit presentation start time (VOBU_S_PTM) representing the VOBU's reproduction start time point in the form of a time stamp value. Accordingly, the VOBU_PTM's value may be adapted as a subject PTS in the FIG. 4 flow chart.

Furthermore, the navigation pack includes disk search information (data search information (DSI)) for the VOBU. DSI includes backward information (BWDI) for referencing a VOBU reproduced temporally before a particular VOBU, and forward information (FWDI) for referencing a VOBU reproduced temporally after the particular VOBU. More specifically, the FWDI and BWDI correspond in FIG. 3 to forward and backward search pointers 262 and 263, respectively.

Thus in the present embodiment if for a designated reproduction start time point a tentatively determined start packet has a PTS with a large error a search pointer can be employed to reduce the error between the designated time point and the PTS to allow information to be reproduced as corresponding to the reproduction start time point more precisely than conventional.

Furthermore in the present embodiment each packet's reproduction time is assumed to be equal and a tentative start packet is thus predetermined. This allows a time search process to be done in a shorter period of time than when time stamps are successively read from packets to determine a start packet corresponding to a designated time point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reproduction apparatus reproducing information to be reproduced including a plurality of packets that can have different reproduction times, comprising:
   a receiver receiving as said information to be reproduced audio information stored on a digital versatile disk;
   an input device operated by a user to input a designated time point; and
   a reproducer receiving said information to be reproduced from said receiver and said designated time point from said input device to determine therefrom a start packet among said plurality of packets and set said start packet as a start point to reproduce said information to be reproduced, said reproducer including
      a tentative determinator receiving said information to be reproduced and said designated time point to calculate an average value of said plurality of packets' respective reproduction times and determine as a tentative start packet a packet started to be reproduced at a time point closest to said designated time point if said plurality of packets were each reproduced in an order of reproduction for said average value,
      a calculator operative for said tentative start packet including a time stamp to read said time stamp to determine therefrom a reproduction time point of said tentative start packet if said tentative start packet were reproduced, and operative for said tentative start packet excluding a time stamp to read a time stamp from a packet to be reproduced before or after said tentative packet and therefrom determine said reproduction time point to calculate an error between said reproduction time point and said designated time point, said tentative start packet being a packet including a pointer designating a relative location of a packet to be reproduced at a time point before or after said reproduction time point by a predetermined unit time,
      a final determinator operative for said error falling within a predetermined range to determine said tentative reproduction start point as an effective reproduction start point, and operative for said error exceeding said predetermined range to use said pointer to retrieve a packet to be reproduced before or after said tentative start packet that is reproduced at a time point having an error from said designated time point falling within said predetermined range, and correct said tentative reproduction start point to indicate said retrieved packet to determine said effective reproduction start point, and
      a packet reproducer starting reproducing said information to be reproduced with said effective reproduction start point serving as a start point.

2. A reproduction apparatus reproducing information to be reproduced including a plurality of packets that can be different from each other in reproduction time, comprising:
   a receiver receiving said information to be reproduced;
   an input device operated by a user to input a designated time point; and
   a reproducer receiving said information to be reproduced from said receiver and said designated time point from said input device to determine therefrom a start packet among said plurality of packets, and setting said start packet as a start point to reproduce said information to be reproduced, said reproducer including
      a tentative determinator determining among said plurality of packets a tentative start packet corresponding to a tentative reproduction start point calculated from said information to be reproduced and said designated time point received,
      a calculator calculating an error between said designated time point and a reproduction time point of said tentative start packet if said tentative start packet were reproduced,
      a final determinator correcting said tentative reproduction start point in accordance with said error to determine an effective reproduction start point and determine among said plurality of packets an effective start packet corresponding to said effective reproduction start point, and
      a packet reproducer starting reproducing said information to be reproduced with said effective start packet serving as a start point.

3. The reproduction apparatus according to claim 2, wherein if said error falls within a predetermined range said final determinator determines said tentative reproduction start point as said effective reproduction start point, and if said error exceeds said predetermined range said final determinator retrieves a packet to be reproduced before or after said tentative start packet and corrects said tentative reproduction start point to allow said effective reproduction start point to indicate a packet reproduced at a time point having an error from said designated time point falling within said predetermined range to determine said effective reproduction start point.

4. The reproduction apparatus according to claim 2, wherein if said tentative start packet includes a time stamp said time stamp is read and therefrom said calculator determines said reproduction time point, and if said tentative start packet does not include a time stamp then said calculator determines said reproduction time point as based on a time stamp read from a packet to be reproduced before or after said tentative start packet and including said time stamp, said tentative start packet includes a pointer designating a relative location of a packet to be reproduced at a time point before or after said reproduction time point by a predetermined unit time, and if said error exceeds said predetermined range said final determinator uses said pointer to correct said tentative reproduction start point.

5. The reproduction apparatus according to claim 2, wherein said tentative determinator calculates an average value of said plurality of packets' respective reproduction times and determines as said tentative start packet a packet started to be reproduced at a time point closest to said designated time point if said plurality of packets were each reproduced in an order of reproduction for said average value.

6. The reproduction apparatus according to claim 2, wherein said receiver receives audio information recorded on a digital versatile disk as said information to be reproduced.

7. A method of reproducing information to be reproduced including a plurality of packets that can have different reproduction times, comprising the step of:

receiving as said information to be reproduced audio information stored on a digital versatile disk;

inputting a designated time point by a user; and determining from said information to be reproduced and said designated time point a start packet among said plurality of packets, and setting said start packet as a start point to reproduce said information to be reproduced, the step of determining and setting including receiving said information to be reproduced and said designated time point to calculate an average value of said plurality of packets' respective reproduction times to determine as a tentative start packet a packet started to be reproduced at a time point closest to said designated time point if said plurality of packets were each reproduced in an order of reproduction for said average value, if said tentative start packet includes a time stamp, reading said time stamp to determine therefrom a reproduction time point of said tentative start packet if said tentative start packet were reproduced, and if said tentative start packet excludes a time stamp, reading a time stamp from a packet to be reproduced before or after said tentative packet to determine therefrom said reproduction time point to calculate an error between said reproduction time point and said designated time point, said tentative start packet being a packet including a pointer designating a relative location of a packet to be reproduced at a time point before or after said reproduction time point by a predetermined unit time, if said error falls within a predetermined range, determining said tentative reproduction start point as an effective reproduction start point, and if said error exceeds said predetermined range, using said pointer to retrieve a packet to be reproduced before or after said tentative start packet that is reproduced at a time point having an error from said designated time point falling within said predetermined range, and correcting said tentative reproduction start point to indicate said retrieved packet to determine said effective reproduction start point, and setting said effective reproduction start point as a start point to start reproducing said information to be reproduced.

8. A method of reproducing information to be reproduced including a plurality of packets that can have different reproduction times, comprising the step of:

receiving said information to be reproduced;

inputting a designated time point by a user; and determining from said information to be reproduced and said designated time point a start packet among said plurality of packets and setting said start packet as a start point to reproduce said information to be reproduced, the step of determining and setting including determining among said plurality of packets a tentative start packet corresponding to a tentative reproduction start point calculated from said information to be reproduced and said designated time point received, calculating an error between said designated time point and a reproduction time point of said tentative start packet if said tentative start packet were reproduced, correcting said tentative reproduction start point in accordance with said error to determine an effective reproduction start point and determine among said plurality of packets an effective start packet corresponding to said effective reproduction start point, and setting said effective start packet as a start point to start reproducing said information to be reproduced.

9. The method according to claim 8, wherein in the step of correcting if said error falls within a predetermined range said tentative reproduction start point is determined as said effective reproduction start point and if said error exceeds said predetermined range a packet to be reproduced before or after said tentative start packet is retrieved and said tentative reproduction start point is corrected to allow said effective reproduction start point to indicate a packet reproduced at a time point having an error from said designated time point falling within said predetermined range to determine said effective reproduction start point.

10. The method according to claim 8, wherein in the step of calculating if said tentative start packet includes a time stamp said time stamp is read and therefrom said reproduction time point is determined and if said tentative start packet does not include a time stamp then said reproduction time point is determined as based on a time stamp read from a packet to be reproduced before or after said tentative start packet and including said time stamp, said tentative start packet includes a pointer designating a relative location of a packet to be reproduced at a time point before or after said reproduction time point by a predetermined unit time, and in the step of correcting if said error exceeds said predetermined range said pointer is used to correct said tentative reproduction start point.

11. The method according to claim 8, wherein in the step of determining said tentative start packet an average value of said plurality of packets' respective reproduction times is calculated and as said tentative start packet a packet is determined that is started to be reproduced at a time point closest to said designated time point if said plurality of packets were each reproduced in an order of reproduction for said average value.

12. The method according to claim 8, wherein in the step of receiving, audio information recorded on a digital versatile disk is received as said information to be reproduced.

* * * * *